United States Patent [19]

Iwashita et al.

[11] Patent Number: 4,522,477
[45] Date of Patent: Jun. 11, 1985

[54] ELECTRIC MOTOR DRIVE DEVICE FOR CAMERA

[75] Inventors: Tomonori Iwashita, Tokyo; Hidehiko Fukahori, Kanagawa, both of Japan

[73] Assignee: Canon Kabushiki Kaisha, Tokyo, Japan

[21] Appl. No.: 528,237

[22] Filed: Aug. 31, 1983

Related U.S. Application Data

[63] Continuation of Ser. No. 322,226, Nov. 17, 1981, abandoned.

[30] Foreign Application Priority Data

Nov. 25, 1980 [JP] Japan ................................. 55-168661

[51] Int. Cl.$^3$ ............................................... G03B 1/12
[52] U.S. Cl. .................................. 354/173.1; 354/214
[58] Field of Search ........................ 354/171, 173, 214

[56] References Cited

U.S. PATENT DOCUMENTS 3,783,762  1/1974  Sugimori ............................. 354/173
3,994,003  11/1976  Iwashita et al. ..................... 354/173
4,272,173  6/1981  Iwashita et al. ..................... 354/173

Primary Examiner—John Gonzales
Attorney, Agent, or Firm—Toren, McGeady, Stanger

[57] ABSTRACT

In an electric motor drive device for a camera having first and second one-way clutches arranged to transmit a driving force either to a film winding transmission member or to a film rewinding transmission member by a change-over operation on the rotation of a driving motor between normal and reverse rotating directions, a charge cam provided between the first one-way clutch which transmits a driving force of the rotation of the motor in the normal direction to the film winding transmission member and the winding transmission member is arranged to rotate together therewith. The charge of a charge mechanism disposed within the motor drive device resulting from the rotation of the charge cam is arranged to be effected approximately in phase with the charge of a charge mechanism which is disposed within the camera and is arranged to be driven by the winding transmission member.

2 Claims, 3 Drawing Figures

ELECTRIC MOTOR DRIVE DEVICE FOR CAMERA

This is a continuation of application Ser. No. 322,226, filed Nov. 17, 1981, abandoned.

BACKGROUND OF THE INVENTION

1. Field of the Invention

This invention relates to an electric motor drive device for a camera and more particularly to a motor drive device provided with driving mechanisms such as an electric motor winding, rewinding and counter mechanisms.

2. Description of the Prior Art

There have been known varied kinds of electric motor drive devices for cameras arranged to have film winding and rewinding operations carried out by means of drive motors. These known electric motor drive devices include a type wherein two one-way clutches each of which is capable of transmitting a rotation force in only one direction different from that of a rotation force to be transmitted by the other are mounted on the output shaft of the motor. The driving force of the motor is transmitted to a film winding mechanism, for example, when the motor rotates in a normal direction and to a film rewinding mechanism when it rotates in the reverse direction. This type of device is known, for example, from U.S. Pat. No. 3,981,022.

The electric motor drive device of the above stated type having one-way clutches obviates the necessity of engaging and disengaging gears for change-over between a film winding operation and a film rewinding operation. Therefore, the change-over can be smoothly accomplished. Besides, tooth faces of gears wear out to a lesser degree. On the other hand, however, the construction of the device is complex. Further, it is another shortcoming of the device of the prior art that A film counter, an automatic exposure control device, and the like must be arranged such that they will be reliably charged with each winding of one frame portion of the film. It is desirable that the charged phase preferably coincides with the charged phase of a shutter charge mechanism or the like disposed on the side of the camera. In the case of the electric motor drive device using one-way clutches, however, the one-way clutches are interposed between a driving gear and a film winding transmission member engaging the film winding shaft of the camera. Therefore, play or the like in the one-way clutches causes a phase discrepancy between the winding transmission member and the driving gear. It has been difficult, therefore, to attain coincidence in phase between the charging action performed within the camera and the charging action performed within the electric motor drive device or unit. It has been a further shortcoming of the electric motor drive device of this type that a film counter, etc. cannot be accurately operated because of the above stated phase discrepancy.

SUMMARY OF THE INVENTION

This invention is directed to the elimination of the above stated shortcomings of the conventional devices. It is therefore an object of the invention to provide an electric motor drive device of a simple construction in which a charge cam is provided between a film winding transmission member and a one-way clutch arranged to transmit the driving force of a motor to the winding transmission member at the time of film winding, with the charge cam being arranged to permit charging approximately in phase agreement with the camera.

The above and further objects, features and advantages of the invention will become apparent from the following detailed description of an embodiment thereof taken in connection with the accompanying drawings.

DETAILED DESCRIPTION OF PREFERRED EMBODIMENT

Figure 1:
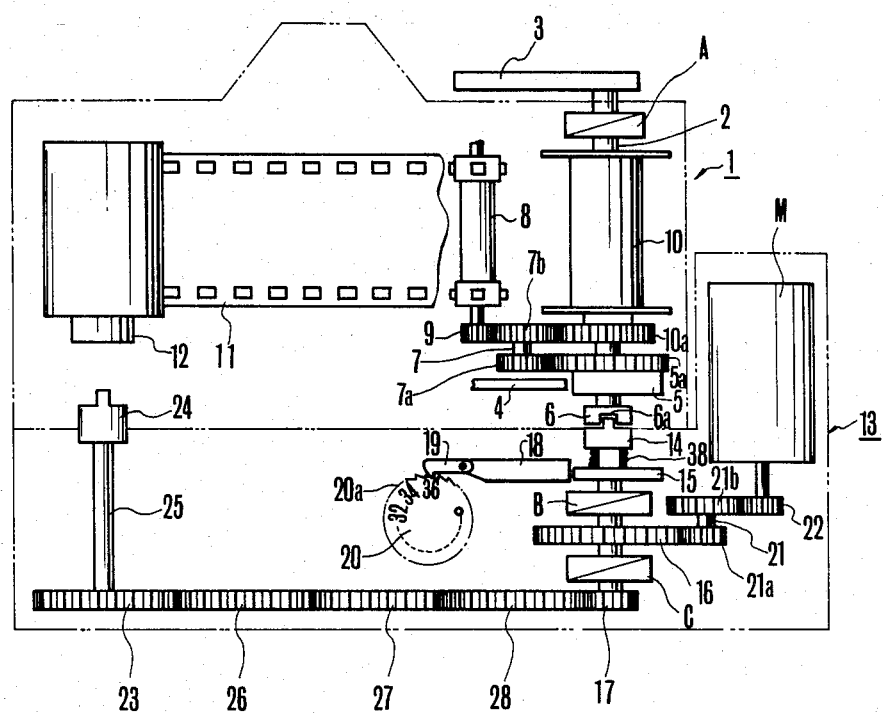
FIG. 1 is a plan view showing an electric motor drive device for a camera as an embodiment of the present invention.

In the embodiment shown in FIG. 1, a camera 1 has a film winding shaft 2. The shaft 2 has a film winding lever 3 connected to the upper part thereof through a one-way clutch A. At the lower part of the winding shaft 2, there is provided a charge cam 5. The cam 5 is secured to the lower part of the winding shaft 2 and is arranged into one unified body with a winding gear 5a for charging a member to be charged within the camera, such as a shutter or the like. Further, to the lower end of the winding shaft is secured a winding coupler 6, which is arranged to be coupled with a winding transmission member 14 disposed within an electric drive device or unit 13 which will be described later. There is provided a double gear 7 consisting of a small gear 7a which engages the above stated winding gear 5a and a large gear 7b which is arranged to engage a take-up gear 10a coupled with a sprocket gear 9 provided for driving a sprocket 8 and also with a take-up spool 10 through a known friction mechanism which is not shown. A reference numeral 11 indicates a film; 12 indicates a film cartridge; 13 indicates the electric motor drive device (or unit); 14 indicates the above stated winding transmission member; 15 indicates a charge cam of the electric motor drive unit 13; a reference symbol B indicates a winding one-way clutch; a numeral 16 indicates a winding gear of the motor drive unit; a symbol C indicates a rewinding one-way clutch; and a numeral 17 indicates a rewinding pinion. The details of arrangement of these parts will be described later with reference to FIG. 2. There is provided a charge lever 18 which is slidable to the right and left through a mechanism which is not shown and normally has its position restricted by a spring (not shown) in the rightward direction. Meanwhile, a feed claw 19 for driving a film counter 20 is attached to the left end of the charge lever 18. The film counter 20 which is of the known type has a ratchet part 20a formed along the outer circumference thereof. The construction of the counter is omitted from the description. The motor drive unit further includes a double gear 21 consisting of a small gear 21a which engages the above stated winding gear 16 and a large gear 21b which engages a pinion 22 secured to the output shaft of the driving motor M. A rewinding gear 23 is connected through a rewinding shaft 25 to a rewinding coupler 24 which is arranged to engage the film cartridge 12 at the time of rewinding. The rewinding gear 23 further engages the rewinding pinion 17 through intermediate gears 26, 27 and 28.

Figure 3:
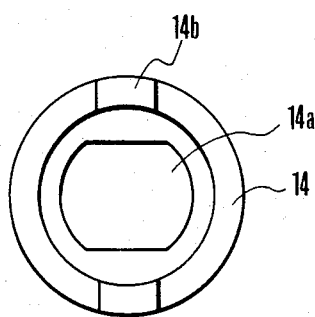
FIG. 3 is a plan view showing a winding transmission member as seen from above.
Figure 2:
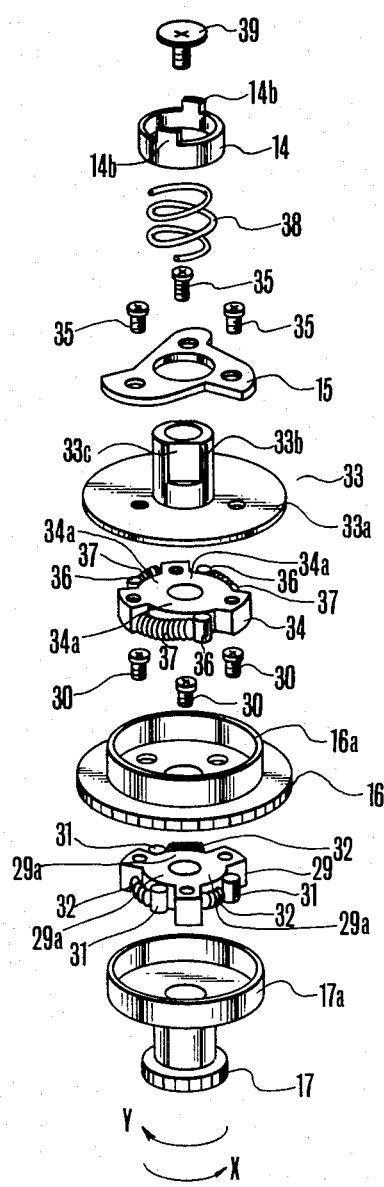
FIG. 2 is an oblique exploded view showing the structural arrangement of the essential parts of the embodiment shown in FIG. 1.

FIG. 2 is an exploded view of the essential parts of the electric motor drive unit. These essential parts are arranged as described below:

The above stated pinion 17 is rotatably supported by a fixed winding shaft which is not shown. A cylindrical part 17a is provided on the upper face of the pinion 17. A wind mill shaped winding wheel 29 is secured to the winding gear 16 by screws 30. The wheel 29 is provided with rollers 31 which have their positions in the rolling directions restricted by springs 32. The rollers 31 are in contact with the tapered parts 29a of the wheel 29 and also in contact with the inner wall of the cylindrical part 17a disposed on the upper end of the rewinding pinion 17. When the winding gear 16 rotates in the direction of an arrow Y, the tapered parts 29a are freed from the rollers 31 to allow the rotating force of the winding gear 16 to be transmitted to the rewinding pinion 17. When the winding gear 16 rotate conversely to the direction of an arrow Y, the tapered parts 29a of the rewinding wheel 29 come into contact with the rollers 31 to have the rotating force of the winding gear 16 transmitted to the rewinding pinion 17. The winding gear 16 is rotatably supported by a fixed winding shaft, which is not shown, and is provided with a cylindrical part 16a which is disposed on the upper face of the pinion 16. A winding member 33 is rotatably supported by the above stated fixed winding shaft (not shown) and is arranged to have the charge cam 15 abut on the upper face of the flange part 33a thereof. Meanwhile, a winding wind mill shaped wheel 34 is arranged to abut on the lower face of the flange part 33a and is fixed by screws 35. The winding wheel 34 is provided with rollers 36. The positions of the rollers 36 in their rotating directions are restricted by springs 27. The rollers 36 are in contact with the tapered parts 34a of the winding wheel 34 and also with the inner wall of the cylindrical part 16a disposed on the upper face of the winding gear 16. When the winding gear 16 rotates in the direction of the arrow X, the tapered parts 34a to the winding wheel come in contact with the rollers 36 to allow the rotating force of the winding gear 16 to be transmitted to the winding member 33. Conversely, when the winding gear 16 rotates in the direction of the arrow Y, the tapered parts 34a are freed from the rollers 36 to have the rotating force of the winding gear 16 not transmitted to the winding member 33. A rising part 33b of the winding member 33 is provided with two cutaway faces 33c. The rising part 33b is inserted in the winding transmission member 14 through a spring 38. Then, as shown in FIG. 3, an oval shaped opening 14a of the winding transmission member 14 engages the two cutaway faces 33c of the rising part 33b of the winding member 33. The winding transmission member 14 is provided with claw parts 14b which are arranged to engage the recessed parts 6a of the winding coupler 6 of the camera. The above stated fixed winding shaft which is not shown is provided with a screw 39 which is secured to the fixed shaft to prevent the winding transmission member 14 from pulling out upward. Meanwhile, the winding transmission member 14 is constantly urged upward by the spring 38. While the winding transmission member 14 is movable downward against the force of the spring 38, the member 14 is arranged to rotate together with the winding member 33 and the charge cam 15 because the oval opening 14a of the member 14 is engaging the two cutaway faces 33c of the winding member 33 (see FIG. 3). The arrangement to permit the winding transmission member 14 to move in the upward and downward directions serves as an absorption mechanism in attaching the electric motor drive unit to the camera. As will be clearly understood from the detailed description above, the winding one-way clutch B comprises the winding wheel 34, rollers 36, the springs 37 and the cylindrical part 16a of the winding gear 16. Meanwhile, the rewinding one-way clutch C is composed of the rewinding wheel 29, the rollers 31, the springs 32 and the cylindrical parts 17a of the rewinding pinion 17.

With the embodiment arranged as described above, the operation thereof is as follows: First, in the case of the electric motor winding operation, a voltage in a normal direction is impressed on the motor M through a circuit which is not shown to have the motor M rotate in the normal direction. Then, the winding gear 16 is caused to rotate in the direction of the arrow X as shown in FIG. 2 through the gear train 22 and 21. This in turn causes the winding member 33 to rotate in the direction of the arrow X through the winding one-way clutch B. The charge cam 15 of the electric motor drive unit then rotates to cause the lever 18 to move to the left and right to make one reciprocative movement to advance thereby the film counter 20 to an extent corresponding to one frame portion of the film. Concurrently with this, the winding transmission member 14 rotates. This causes the winding coupler 6 and the charge cam 5 of the camera to rotate in phase coincidence with charge cam 15. The charge lever 4 then moves to the left and right to make one reciprocation and thus charges the shutter or the like which is not shown. Further, since the winding gear 5a also rotates at this time, the sprocket 8 and the take-up spool 10 are caused to rotate through the gear train 7, 9 and 10a to wind the film 11 as much as one frame portion thereof.

Next, in manually winding the film, the power supply to the motor M is cut off beforehand. When the winding lever 3 is manually turned in the direction of the arrow X as shown in FIG. 2, the winding shaft 2 is rotated through the one-way clutch A disposed within the camera as the rotation of the winding lever 3 in the direction of the arrow X is arranged to be transmissible through the clutch A. Then, the winding gear 5a rotates to cause the sprocket 8 and the take-up spool 10 to rotate through the gear train 7, 9 and 10a so that the film 11 can be wound as much as one frame portion thereof. The rotation of the winding gear 5a also causes the charge cam of the camera to rotate to cause in turn the charge lever 4 to reciprocate once moving to the left and right to charge the shutter or the like which is not shown. Since the winding coupler 6 also rotates at this time, this causes the charge cam 15 of the electric motor drive unit in phase coincidence with the charge cam 5 through the winding rotation transmission member 14 and the winding member 33. This causes the charge lever 18 to reciprocate once moving to the left and right and the film counter 20 is advanced to an extent corresponding to one frame portion of the film. However, since the rotation is not transmitted to the winding gear 16 with the rollers 36 freed from the tapered parts 34a when the winding member 33 or the winding wheel rotates in the direction of the arrow X, the winding gear 16 does not rotate.

The operation in the case of electrical motor rewinding is as follows: The sprocket 8 and the sprocket gear 9 are uncoupled from each other by a known arrangement which is not shown. After that, a voltage in the reverse direction is impressed on the motor M through a circuit which is not shown to cause the motor to rotate in the reverse direction. The reverse rotation of the motor M causes the winding gear 16 to rotate in the direction of the arrow Y as shown in FIG. 2 through the gear train 22 and 21. This rotation of the winding gear 16 then causes the rewinding pinion 17 to rotate through the rewinding one-way clutch C. The rewinding shaft 25 is also caused to rotate through the gear train 28, 27, 26 and 23. With the rewinding shaft 25 rotated, a known arrangement which is not shown causes the rewinding coupler 24 to engage the film cartridge 12 to rewind the film 11. Then, since no rotating force is transmitted through the winding one-way clutch B at that time, the charge cam 15 of the electric motor drive unit does not rotate and, accordingly, the winding shaft of the camera also does not rotate. Therefore, the charge cam 5 of the camera does not rotate. Meanwhile, although the film causes the take-up spool 10 to rotate in the reverse direction, a friction mechanism which is not shown does not allow the winding gear 10a to rotate.

In accordance with the present invention, as described in detail in the foregoing, a charge cam is provided between the winding one-way clutch and the winding transmission member; and the charging action performed on the side of the camera and the charging action performed on the side of the electric motor drive unit are arranged to coincide in phase with each other during both electric motor winding and manual winding. Therefore, in cases where a film counter and an automatic exposure control device are included in an electric motor drive unit of the type using one-way clutches for changeover between a film winding action and a film rewinding action, the arrangement according to the invention enables the motor drive unit to accurately operate without fail to enhance the reliability of the photographing operations of the camera.

Further, with the winding one-way clutch, the charge cam and the winding transmission member arranged coaxially according to the invention, the structural arrangement of the electric motor drive unit having the above stated advantage can be simplified to a great extent.

While a specific embodiment of the invention has been shown and described in detail to illustrate the application of the inventive principles, it will be understood that the invention may be embodied otherwise without departing from such principles.

What is claimed is:

1. An electric motor drive device for a camera, comprising:
   (a) a motor having an output shaft;
   (b) a driving gear supported in a freely rotatable manner on a support shaft different from said output shaft, said driving gear being rotated in a first direction by rotation of said motor in a first normal direction and being rotated in a second direction by rotation of said motor in a reverse direction;
   (c) a winding transmission member supported in a freely rotatable manner at said support shaft, said winding transmission member enabling said camera to effect a winding operation by rotation of said motor;
   (d) a charge cam supported at said support shaft so as to rotate integrally with said winding transmission member, with rotation of said charge cam operating to effect charging of a mechanism provided at said electric drive device by rotation;
   (e) a first one-way clutch to transmit the rotation of said driving gear to said winding transmission member when said driving gear rotates in said first direction, said first one-way clutch being supported at said support shaft in such a manner as to intervene between said driving gear and said winding transmission member;
   (f) a rewinding transmission member to enable said camera to effect a rewinding operation upon rotation of said motor;
   (g) a rewinding gear supported at said support shaft in a freely rotatable manner, with rotation of said rewinding gear being transmitted to said rewinding transmission member; and
   (h) a second one-way clutch to transmit the rotation of said driving gear to said rewinding gear when said driving gear rotates in said second direction, said second one-way clutch being supported at said support shaft in such a manner as to intervene between said driving gear and said rewinding gear.

2. A device according to claim 1, wherein said winding transmission member is arranged to be slidable in the axial direction thereof.

* * * * *